(12) United States Patent
Shin

(10) Patent No.: US 6,257,080 B1
(45) Date of Patent: Jul. 10, 2001

(54) POWER-SHIFTED TRANSMISSION FOR INDUSTRIAL VEHICLES

(75) Inventor: Sang Ho Shin, Incheon (KR)

(73) Assignee: Daewoo Heavy Industries Ltd., Incheon (KR)

( * ) Notice: Subject to any disclaimer, the term of this patent is extended or adjusted under 35 U.S.C. 154(b) by 0 days.

(21) Appl. No.: 09/384,345

(22) Filed: Aug. 27, 1999

(30) Foreign Application Priority Data

Aug. 28, 1998 (KR) .................................................. 98-35110

(51) Int. Cl.⁷ ...................................................... F16H 3/08
(52) U.S. Cl. .................................. 74/325; 74/331; 74/333
(58) Field of Search ............................. 74/325, 333, 356, 74/360, 331; 192/3.63

(56) References Cited

U.S. PATENT DOCUMENTS

| | | | |
|---|---|---|---|
| 4,549,443 | * 10/1985 | White | 74/360 |
| 5,471,892 | * 12/1995 | Sherman | 74/325 |
| 5,557,978 | * 9/1996 | McAskill | 74/331 |
| 5,592,853 | * 1/1997 | Rebholz et al. | 74/325 |
| 5,715,727 | * 2/1998 | Janiszewski | 74/325 |
| 5,743,142 | * 4/1998 | Leber et al. | 74/331 |

* cited by examiner

Primary Examiner—Sherry Estremsky
Assistant Examiner—Tisha D. Lewis
(74) Attorney, Agent, or Firm—Staas & Halsey LLP

(57) ABSTRACT

A power-shifted transmission for industrial vehicles comprises a transmission casing and input and output shafts rotatably mounted on the transmission casing. The input and output shafts are drivingly connectable to each other through a forward shaft assembly, a reverse shaft assembly and an intermediate shaft assembly. The forward shaft assembly is rotatingly driven by the input shaft and operable to deliver the torque of the input shaft to the output shaft at a first or second forward gear ratio. The reverse shaft assembly is rotatingly driven by the forward shaft assembly and operable to deliver the torque of the input shaft to the output shaft at a first or second reverse gear ratio. The intermediate shaft assembly is rotatingly driven by the reverse shaft assembly and operable to deliver the torque of the input shaft to the output shaft at a third forward gear ratio.

13 Claims, 3 Drawing Sheets

POWER-SHIFTED TRANSMISSION FOR INDUSTRIAL VEHICLES

FIELD OF THE INVENTION

The present invention is directed generally to a power-shifted transmission for industrial vehicles and more specifically to a power-shifted transmission of the type capable of establishing three different forward gear ratios and two different reverse gear ratios with the use of simple and efficiently operable transmission components.

BACKGROUND OF THE INVENTION

As is generally known in the art, such industrial vehicles as forklift trucks, hydraulic excavators and telescopic handlers make use of pressurized fluid to perform an intended task. The pressurized fluid is produced by means of a reversible hydraulic pump which in turn is drivingly connected to an engine. The power of the engine is also utilized to have the industrial vehicles go forwards and backwards at different speeds selected by the operator.

In order to enable the operator to change the speed and the direction of movement of the industrial vehicles, a variety of power-shifted transmissions have been employed, including: parallel shaft type transmissions; and planetary gear type transmissions. Most of the state-of-the-art parallel shaft type transmissions are so constructed as to establish three forward gear ratios and three reverse gear ratios depending on the operator's desire. These type of transmissions tend to require an increased number of gear shafts, bearings and hydraulically operated clutches, which may of course makes the transmissions structurally complicated, bulky and heavy weight. Another drawback of the conventional parallel shaft type transmissions is that the number of gears meshed and the number of clutches engaged for establishing an intended gear ratio would be necessarily increased, thus deteriorating operability and durability of the transmissions.

As a solution to the afore-mentioned shortcomings, use has been made of the planetary gear type power-shifted transmissions which is usually provided with a sun gear, planetary pinion gears, a ring gear, hydraulically operated clutches for causing these gears to be coupled together for rotation as a unit and hydraulically operated brakes for releasably securing these gears to a transmission casing against any rotation. Two or more forward gear ratios can be established by selectively actuating the clutches and the brakes through the use of pressurized fluid. Although the planetary gear type transmissions have compact structure as compared with the parallel shaft type transmissions, they are costly to fabricate and hard to diversify gear ratios, thus heavily restricting the freedom of design of the transmissions.

SUMMARY OF THE INVENTION

Accordingly, it is an object of the invention to provide a power-shifted transmission for industrial vehicles which can substantially eliminate the deficiencies inherent in the prior art transmissions.

Another object of the invention is to provide a power-shifted transmission for industrial vehicles which can be fabricated with ease and at diversified gear ratios, while enjoying improved operability and durability.

With these objects in view, the present invention provides a power-shifted transmission for industrial vehicles capable of accomplishing first through third forward gear ratios and first and second reverse gear ratios, comprising: a transmission casing; an input shaft rotatably mounted on said transmission casing and having a drive gear for unitary rotation therewith; a forward shaft assembly including a forward shaft rotatably mounted on said transmission casing, first and second forward gears rotatably fitted to the forward shaft, a forward clutch cylinder rotatable about the forward shaft and having a cylinder gear in meshing engagement with the drive gear of said input shaft, and first and second forward clutches selectively operable to couple one of the first and second forward gears with the forward clutch cylinder; a reverse shaft assembly including a reverse shaft rotatably mounted on said transmission casing, first and second reverse gears rotatably fitted to the reverse shaft, a reverse clutch cylinder rotatable about the reverse shaft and having a cylinder gear in meshing engagement with the cylinder gear of the forward clutch cylinder, and first and second reverse clutches selectively operable to couple one of the first and second reverse gears with the reverse clutch cylinder; an intermediate shaft assembly including an intermediate shaft rotatably mounted on said transmission casing, a third forward gear rotatably fitted to the intermediate shaft, an intermediate clutch cylinder rotatable about the intermediate shaft and having a cylinder gear in meshing engagement with the cylinder gear of the reverse clutch cylinder, and a third forward clutch operable to couple the third forward gear with the intermediate clutch cylinder; and an output shaft rotatably mounted on said transmission casing and having first through third driven gears each fixedly attached to the output shaft for unitary rotation therewith, said first driven gear meshing with the first forward gear and the first reverse gear, said second driven gear meshing with the second forward gear and the second reverse gear, and said third driven gear meshing with the third forward gear.

BRIEF DESCRIPTION OF THE DRAWINGS

Other objects, features and advantages of the invention will become apparent from the following description of the preferred embodiment taken in conjunction with the accompanying drawings in which.

DETAILED DESCRIPTION OF THE PREFERRED EMBODIMENT

Figure 1:
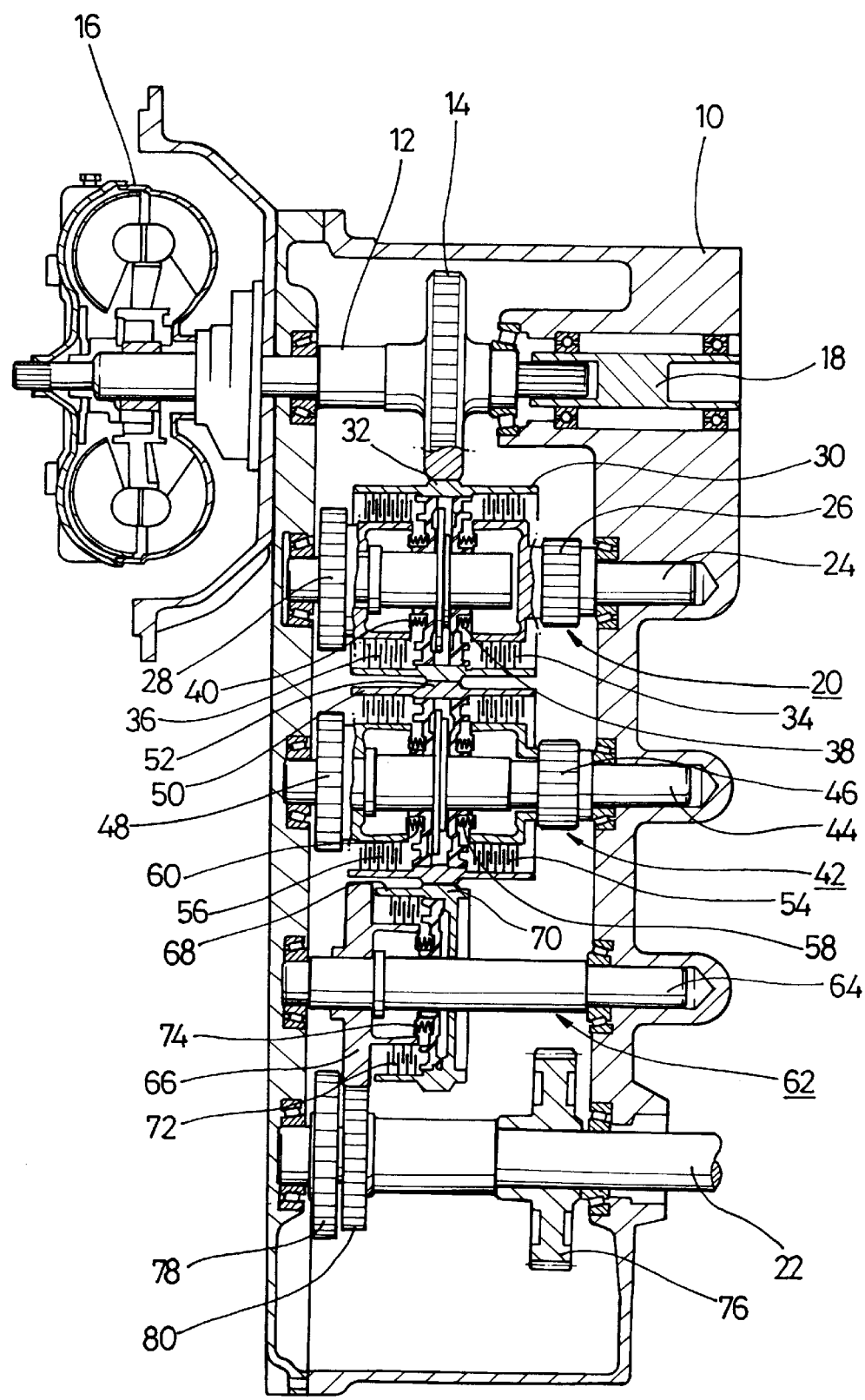
FIG. 1 is an extended cross-sectional view showing a power-shifted transmission in accordance with the present invention, wherein all of rotating shafts are arranged in one and the same plane for the sake of illustration.
Figure 2:
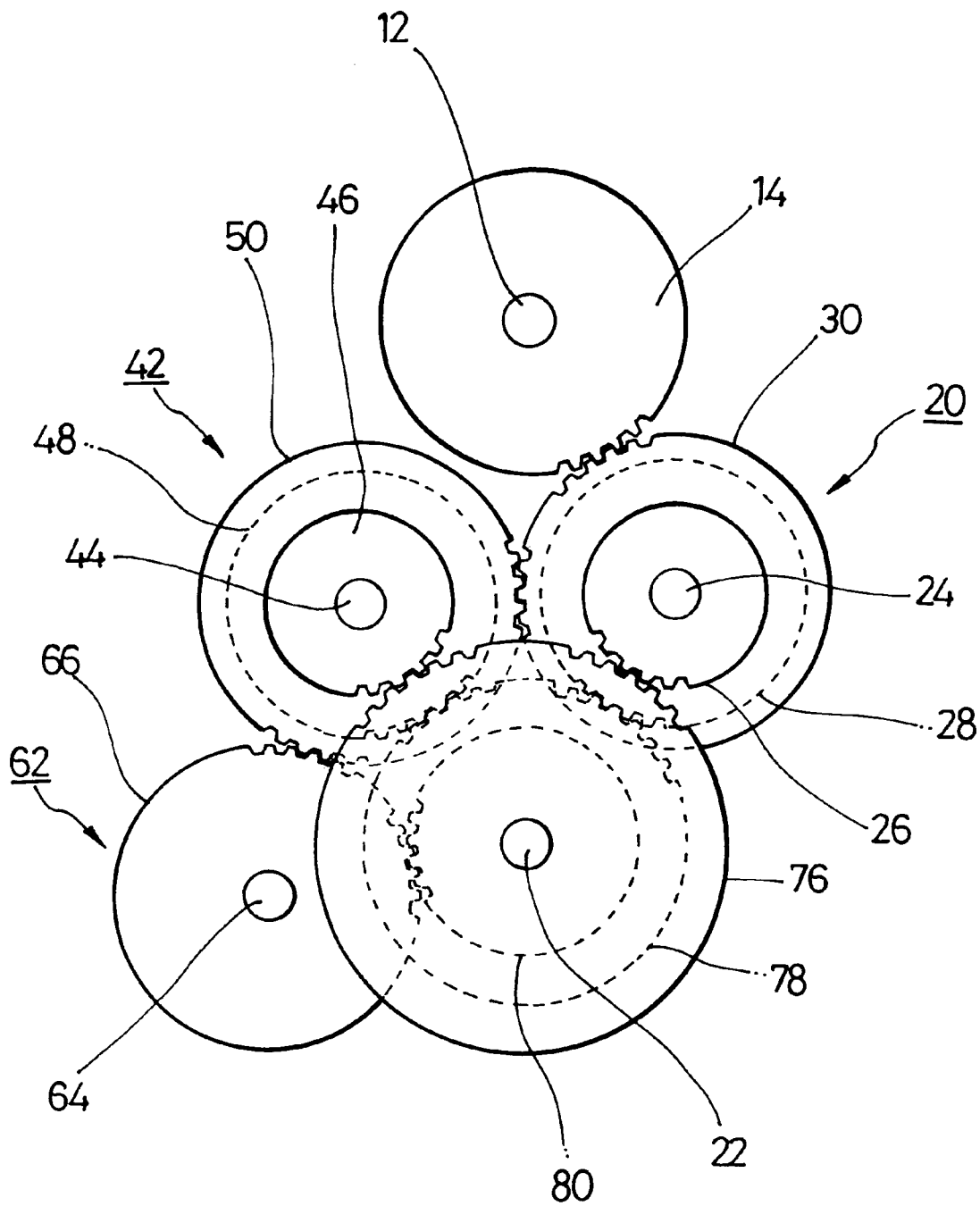
FIG. 2 is a schematic side elevational view best showing the positional relationship of rotating shafts and the meshing condition of gears.
Figure 3:
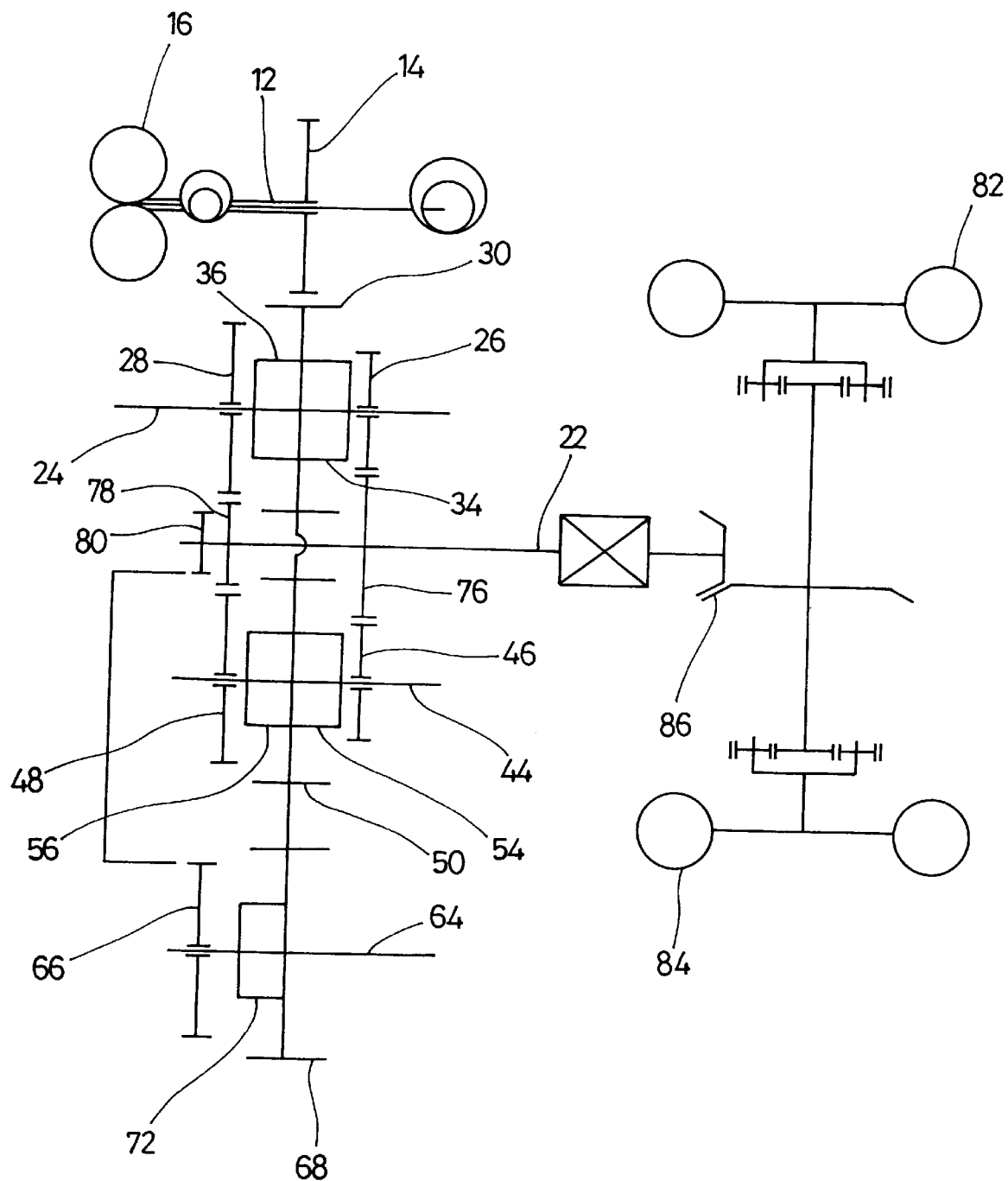
FIG. 3 is a stick diagram schematically illustrating the power delivery line established between an engine and vehicle drive wheels.

Referring now to FIGS. 1 through 3, it can be seen that a parallel shaft type power-shifted transmission in accordance with the invention has a transmission casing 10 at least partially filled with lubricant oil and detachably mountable on the body (not shown) of industrial vehicles such as a forklift truck. An input shaft 12 which has a drive gear 14 fixedly secured thereto for unitary rotation is rotatably mounted on the transmission casing 10, one end of the input shaft 12 being drivingly connected to a torque converter 16 which serves to amplify the torque of an engine (not shown) before it is delivered to the input shaft 12. Concentrically coupled to the other end of the input shaft 12 and rotatably supported on the transmission casing 10 is a power take-off shaft 18 which is operatively connected to, for instance, an oil pump (not shown) of the industrial vehicles.

A forward shaft assembly 20 is provided such that it can be rotatingly driven by the drive gear 14 of the input shaft 12 and operated to deliver the torque of the input shaft 12 to an output shaft 22 at a first or second forward gear ratio. The forward shaft assembly 20 includes a forward shaft 24 rotatably mounted on the transmission casing 10, first and second forward gears 26, 28 rotatably fitted to the forward shaft 24, a forward clutch cylinder 30 freely rotatably about the forward shaft 24 and having a cylinder gear 32 which remains in meshing engagement with the drive gear 14 of the input shaft 12, and first and second forward clutches 34, 36 selectively operable to couple one of the first and second forward gears 26, 28 with the forward clutch cylinder 30 so that they can be rotated as a unit about the forward shaft 24. The first and second forward clutches 34, 36, which may be hydraulically operated multiple disk clutches, are normally biased into a non-operative, disengaging position by means of springs 38, 40, respectively, and can be moved into an operative, engaging position under the action of pressurized working fluid. It should be noted that the first forward gear 26 has a diameter somewhat smaller than the second forward gear 28.

A reverse shaft assembly 42 is provided such that it can be rotatingly driven by the forward clutch cylinder 30 of the forward shaft assembly 20 and operated to deliver the torque of the input shaft 12 to the output shaft 22 at a first or second reverse gear ratio. The reverse shaft assembly 42 includes a reverse shaft 44 rotatably mounted on the transmission casing 10, first and second reverse gear 46, 48 rotatably fitted to the reverse shaft 44, a reverse clutch cylinder 50 freely rotatable about the reverse shaft 44 and having a cylinder gear 52 which remains in meshing engagement with the cylinder gear 32 of the forward clutch cylinder 30, and first and second reverse clutches 54, 56 selectively operable to couple one of the first and second reverse gears 46, 48 with the reverse clutch cylinder 50 so that they can be rotated as a unit about the reverse shaft 44. The first and second reverse clutches 54, 56 which may be hydraulically operated multiple disk clutches, are normally biased into a non-operative, disengaging position by means of springs 58, 60, respectively, and can be moved into an operative, engaging position under the action of pressurized working fluid. As in the forward shaft assembly 20, the first reverse gear 46 of the reverse shaft assembly 42 has a smaller diameter than the second reverse gear 48.

It is important to note that the forward and reverse shaft assemblies 20, 42 are so sized and shaped that they can be interchanged with each other. Interchangeability of the forward and reverse assemblies 20, 42 makes it possible to use parts or components thereof in common, which may help reduce the production cost of the power-shifted transmission.

An intermediate shaft assembly 62 is provided such that it can be rotatingly driven by the reverse clutch cylinder 50 of the reverse shaft assembly 42 and operated to deliver the torque of the input shaft 12 to the output shaft 22 at a third forward gear ratio. The intermediate shaft assembly 62 includes an intermediate shaft 64 rotatably mounted on the transmission casing 10, a third forward gear 66 rotatably fitted to the intermediate shaft 64, and intermediate clutch cylinder 68 freely rotatable about the intermediate shaft 64 and having a cylinder gear 70 in meshing engagement with the cylinder gear 52 of the reverse clutch cylinder 50, and a third forward clutch 72 operable to rigidly couple the third forward gear 66 with the intermediate clutch cylinder 68 so that they can be rotated as a unit about the intermediate shaft 64. The third forward clutch 72, which may be hydraulically operated multiple disk clutch, is normally biased into a non-operative, disengaging position by means of a spring 74 and can be moved into an operative, engaging position under the action of pressurized working fluid.

The output shaft 22 is rotatably mounted on the transmission casing 10 in a spaced-apart relationship with respect to the input shaft 12, as clearly shown in FIG. 2. The output shaft 22 has first through third driven gears 76, 78, 80 each fixedly attached to the output shaft 22 for unitary rotation therewith. As is apparent in FIGS. 2 and 3, the first driven gear 76 meshes with both the first forward gear 26 of the forward shaft assembly 20 and the first reverse gear 46 of the reverse shaft assembly 42, while the second driven gear 78 meshes with both the second forward gear 28 and the second reverse gear 48. Moreover, the third driven gear 80 remains in meshing engagement with the third forward gear 66 of the intermediate shaft assembly 62. It can be appreciated in FIGS. 1 and 2 that the first driven gear 76 has a greater diameter than the second driven gear 78 whose diameter is larger than that of the third driven gear 80. Also noted in FIG. 1 is that the third driven gear 80 of the output shaft 22 is positioned adjacent to the second driven gear 78 and far away form the first driven gear 76.

Referring finally to FIG. 3, the torque of the output shaft 22 is transmitted to vehicle drive wheels 82, 84 via a differential gear box 86 whereby the industrial vehicles equipped with the power-shifted transmission can move forwards or backwards at different speeds.

Operation of the power-shifted transmission in accordance with the invention will be described hereinbelow.

The power-shifted transmission needs to be kept in a neutral condition when the industrial vehicles employing same are stopped and do not move in any direction. In the neutral condition, the first through third forward clutches, 34, 36, 72 and the first and second reverse clutches 54, 56 are all in their non-operative, disengaging positions. Although the forward clutch cylinder 30, the reverse clutch cylinder 50 and the intermediate clutch cylinder 68 are rotatingly driven by the drive gear 14 of the input shaft 12 at this time, no torque will be delivered from the input shaft 12 to the output shaft 22.

In order to establish a first forward gear ratio, the first forward clutch 34 is supplied with the pressurized working fluid and therefore brought into an operative, engaging position. This will cause the first forward gear 26 to be rigidly coupled to the rotating forward clutch cylinder 30, whereby the torque of the input shaft 12 is delivered to the output shaft 22 via the forward clutch cylinder 30, the first forward gear 26 and the first driven gear 76. As a result, the output shaft 22 will be rotated in the forward direction at a first speed.

The second forward clutch 36 is brought into an operative position in order to establish a second forward gear ratio. Such actuation of the second forward clutch 36 will allow the second forward gear 28 to be rigidly connected to the rotating forward clutch cylinder 30, so that the torque of the input shaft 12 is delivered to the output shaft 22 via the forward clutch cylinder 30, the second forward gear 28 and the second driven gear 78. This results in the output shaft 22 being rotated in the forward direction at a second speed.

The intermediate clutch 27 is brought into an operative position for the purpose of accomplishing a third forward gear ratio. This will assure that the third forward gear 66 of the intermediate shaft 64 becomes rigidly coupled to the intermediate clutch cylinder 68, whereby the torque of the input shaft 12 is delivered to the output shaft 22 via the forward clutch cylinder 30, the reverse clutch cylinder 50, the intermediate clutch cylinder 68, the third forward gear 66 and the third driven gear 80. Accordingly, the output shaft 22 can be rotated in the forward direction at a third fastest speed.

In order to establish a first reverse gear ratio, the pressurized working fluid has to be supplied to the first reverse clutch 54 to thereby bring it into an operative, engaging position. This will cause the first reverse gear 46 to be rigidly coupled to the rotating reverse clutch cylinder 50, whereby the torque of the input shaft 12 is delivered to the output shaft 22 via the forward clutch cylinder 30, the reverse clutch cylinder 50, the first reverse gear 46 and the first driven gear 76. As a consequence, the output shaft 22 will be rotated in the reverse direction at a first speed.

The second reverse clutch 56 has to be brought into an operative position with a view to accomplishing a second reverse gear ratio. Such actuation of the second reverse clutch 56 will permit the second reverse gear 48 to be rigidly connected to the rotating reverse clutch cylinder 50, so that the torque of the input shaft 12 can be delivered to the output shaft 22 via the forward clutch cylinder 30, the reverse clutch cylinder 50, the second reverse gear 48 and the second driven gear 78. This results in the output shaft 22 being rotated in the reverse direction at a second speed.

While the invention has been shown and described with reference to a preferred embodiment, it should be apparent to those skilled in the art that many changes and modifications may be made without departing from the scope of the invention as defined in the claims.

What is claimed is:

1. A power-shifted transmission for industrial vehicles capable of accomplishing first through third forward gear ratios and first and second reverse gear ratios, comprising:
   a transmission casing:
   an input shaft rotatably mounted on said transmission casing and having a drive gear for unitary rotation therewith;
   a forward shaft assembly including a forward shaft rotatably mounted on said transmission casing, first and second forward gears rotatably fitted to the forward shaft, a forward clutch cylinder rotatable about the forward shaft and having a cylinder gear in meshing engagement with the drive gear of said input shaft, and first and second forward clutches selectively operable to couple one of the first and second forward gears with the forward clutch cylinder;
   a reverse shaft assembly including a reverse shaft rotatably mounted on said transmission casing, first and second reverse gears rotatably fitted to the reverse shaft, a reverse clutch cylinder rotatable about the reverse shaft and having a cylinder gear in meshing engagement with the cylinder gear of the forward clutch cylinder, and first and second reverse clutches selectively operable to couple one of the first and second reverse gears with the reverse clutch cylinder;
   an intermediate shaft assembly including an intermediate shaft rotatably mounted on said transmission casing, a third forward gear rotatably fitted to the intermediate shaft, an intermediate clutch cylinder rotatable about the intermediate shaft and having a cylinder gear in meshing engagement with the cylinder gear of the reverse clutch cylinder, and a third forward clutch operable to couple the third forward gear with the intermediate clutch cylinder; and
   an output shaft rotatably mounted on said transmission casing and having first through third driven gears each fixedly attached to the output shaft for unitary rotation therewith, said first driven gear meshing with the first forward gear and the first reverse gear, said second driven gear meshing with the second forward gear and the second reverse gear, and said third driven gear meshing with the third forward gear.

2. The power-shifted transmission for industrial vehicles as recited in claim 1, wherein said forward and reverse shaft assemblies are so sized and shaped that they can be interchanged with each other.

3. The power-shifted transmission for industrial vehicles as recited in claim 1, wherein said first forward and reverse gears have a smaller diameter than the second forward and reverse gears, said first driven gear having a greater diameter than the second driven gear, and said second driven gear having a greater diameter than the third driven gear.

4. The power-shifted transmission for industrial vehicles as recited in claim 3, wherein said third driven gear of the output shaft is positioned adjacent to the second driven gear and far away from the first driven gear.

5. The power-shifted transmission for industrial vehicles as recited in claim 1, wherein said first through third forward clutches and said first and second reverse clutches are hydraulically operated multiple disk clutches.

6. The power-shifted transmission for industrial vehicles as recited in claim 5, further comprising resilient biasing means for normally bringing said first through third forward clutches and said first and second reverse clutches into a non-operative position.

7. The power-shifted transmission for industrial vehicles as recited in claim 1, further comprising a power take-off shaft rotatably supported on said transmission casing and concentrically connected to said input shaft.

8. A power-shifted transmission for industrial vehicles, comprising:
   a transmission casing;
   input and output shafts rotatably mounted on said transmission casing and drivingly connectable to each other through a forward shaft assembly, a reverse shaft assembly and an intermediate shaft assembly said input shaft having a drive gear for unitary rotation therewith;
   said forward shaft assembly rotatingly driven by said input shaft and operable to deliver the torque of said input shaft to said output shaft at a first or second gear ratio, said forward shaft assembly including a forward shaft rotatably mounted on said transmission casing, first and second forward gears rotatably fitted to the forward shaft, a forward clutch cylinder rotatable about the forward shaft and having a cylinder gear in meshing engagement with the drive gear of said input shaft, and first and second forward clutches selectively operable to couple one of said first and second forward gears with the forward clutch cylinder;
   said reverse shaft assembly rotatingly driven by said forward shaft assembly and operable to deliver the torque of said input shaft to said output shaft at a first or second reverse gear ratio; and
   said intermediate shaft assembly rotatingly driven by said reverse shaft assembly and operable to deliver the torque of said input shaft to said output shaft at a third forward gear ratio.

9. The power-shifted transmission for industrial vehicles as recited in claim 8, wherein said reverse shaft assembly includes a reverse shaft rotatably mounted on said transmission casing, first and second reverse gears rotatably fitted to the reverse shaft, a reverse clutch cylinder rotatable about the reverse shaft and having a cylinder gear in meshing engagement with the cylinder gear of the forward clutch cylinder, and first and second reverse clutches selectively operable to couple one of the first and second reverse gears with the reverse clutch cylinder.

10. The power-shifted transmission for industrial vehicles as recited in claim 8, wherein said forward and reverse shaft assemblies are so sized and shaped that they can be interchanged with each other.

11. The power-shifted transmission for industrial vehicles as recited in claim 8, further comprising a power take-off shaft rotatably supported on said transmission casing and concentrically connected to said input shaft.

12. The power-shifted transmission for industrial vehicles as recited in claim 9, wherein said intermediate shaft assembly includes an intermediate shaft rotatably mounted on said transmission casing, a third forward gear rotatably fitted to the intermediate shaft, an intermediate clutch cylinder rotatable about the intermediate shaft and having a cylinder gear in meshing engagement with the cylinder gear of the reverse clutch cylinder, and a third forward clutch operable to couple the third forward gear with the intermediate clutch cylinder.

13. The power-shifted transmission for industrial vehicles as recited in claim 12, wherein said output shaft has first through third driven gears each fixedly attached to the output shaft for unitary rotation therewith, said first driven gear meshing with the first forward gear and the first reverse gear, said second driven gear meshing with the second forward gear and the second reverse gear, and said third driven gear meshing with the third forward gear.

* * * * *